(12) United States Patent  
Campos et al.

(10) Patent No.: US 8,398,304 B2  
(45) Date of Patent: Mar. 19, 2013

(54) MULTIPLE SENSOR THERMAL MANAGEMENT FOR ELECTRONIC DEVICES

(75) Inventors: Marcelo de Paula Campos, Mogi Mirim (BR); Edevaldo Pereira da Silva, Jr., Campinas (BR); Ivan Carlos Ribeiro do Nascimento, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 155 days.

(21) Appl. No.: 12/985,133

(22) Filed: Jan. 5, 2011

(65) Prior Publication Data

US 2011/0096809 A1    Apr. 28, 2011

Related U.S. Application Data

(62) Division of application No. 11/512,483, filed on Aug. 30, 2006, now Pat. No. 7,887,235.

(51) Int. Cl.  
*G01K 7/00* (2006.01)

(52) U.S. Cl. .......................... 374/178; 374/170; 374/163

(58) Field of Classification Search .................. 374/170, 374/178, 163  
See application file for complete search history.

(56) References Cited

U.S. PATENT DOCUMENTS

| | | | |
|---|---|---|---|
| 5,563,504 A | 10/1996 | Gilbert et al. | |
| 5,737,170 A | 4/1998 | Moyer | |
| 5,821,741 A | 10/1998 | Brokaw | |
| 6,677,808 B1 | 1/2004 | Sean et al. | |
| 6,975,047 B2 | 12/2005 | Pippin | |
| 2002/0093325 A1 | 7/2002 | Ju | |
| 2003/0006747 A1 | 1/2003 | Jaussi et al. | |
| 2003/0107360 A1 | 6/2003 | Gheorghe et al. | |
| 2003/0201822 A1 | 10/2003 | Kang et al. | |
| 2004/0264093 A1* | 12/2004 | Boerstler et al. | 361/103 |
| 2005/0231270 A1 | 10/2005 | Washburn | |
| 2005/0264971 A1* | 12/2005 | Morino | 361/103 |
| 2006/0104001 A1* | 5/2006 | Yoshio | 361/103 |
| 2007/0098041 A1* | 5/2007 | Seo | 374/170 |
| 2007/0216468 A1 | 9/2007 | Duarte | |
| 2007/0237207 A1* | 10/2007 | Aslan et al. | 374/178 |
| 2008/0278868 A1* | 11/2008 | Morino | 361/18 |
| 2011/0150029 A1* | 6/2011 | Pan | 374/1 |

OTHER PUBLICATIONS

Washburn, Clyde, "A Planet Analog exclusive: A bandgap reference for 90nm and beyond," <<www.PlanetAnalog.com/showArticle?articleID=160501575>>, Apr. 6, 2005, 7 pages.

* cited by examiner

*Primary Examiner* — Mirellys Jagan

(57) ABSTRACT

A device includes a current source circuit to separately provide a first current and a second current and a thermal detection device coupleable to the output of the current source circuit. The device further includes a voltage detection circuit to provide a first indicator of a first voltage representative of a voltage at the thermal detection device in response to the second current and a second indicator of a second voltage representative of a voltage difference between the voltage at the thermal detection device in response to the second current and a voltage at the voltage detection device in response to the first current. The device further includes a temperature detection circuit to provide an over-temperature indicator based on the first indicator and the second indicator, wherein an operation of a circuit component of the device can be adjusted based on the over-temperature indicator.

20 Claims, 6 Drawing Sheets

MULTIPLE SENSOR THERMAL MANAGEMENT FOR ELECTRONIC DEVICES

CROSS-REFERENCE TO RELATED APPLICATION

This is a divisional application of and claims priority under 35 U.S.C. §120 to U.S. patent application Ser. No. 11/512,483 entitled "Multiple Sensor Thermal Management for Electronic Devices," by Campos et al., filed Aug. 30, 2006, which is assigned to the current assignee hereof and incorporated herein by reference in its entirety.

FIELD OF THE DISCLOSURE

The present disclosure is related generally to electronic devices and more particularly to thermal detection or monitoring in electronic devices.

BACKGROUND

Thermal monitoring circuit frequently is implemented in electronic devices to avoid device damage due to overheating. Conventional implementations typically are based on the assumption that many devices in the monitoring circuit will be matched and will operate at the same temperature, an assumption that often is not valid and therefore results in poor precision in the detection of the desired temperature threshold. This precision error typically increases as the temperature gradient increases, thereby increasing the risk that an over-temperature event will go undetected and thereby damage a component, or that an otherwise acceptable temperature will be erroneously interpreted as an over-temperature event, which typically would result in an unnecessary shut-down or performance degradation of one or more co-located circuit components.

Further, some conventional implementations use a single thermal detection device to monitor temperature, which often reduces matching problems, but these conventional implementations often use a band-gap reference or other separate voltage reference in order to compare and generate a voltage transition at a threshold temperature. Further, in the event that a number of locations are to be monitored, the same monitoring circuit is repeated for each location in addition to the thermal detection device at each location, resulting in excessive area utilization and hence increased cost. Accordingly, an improved technique for temperature monitoring for an electronic device would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
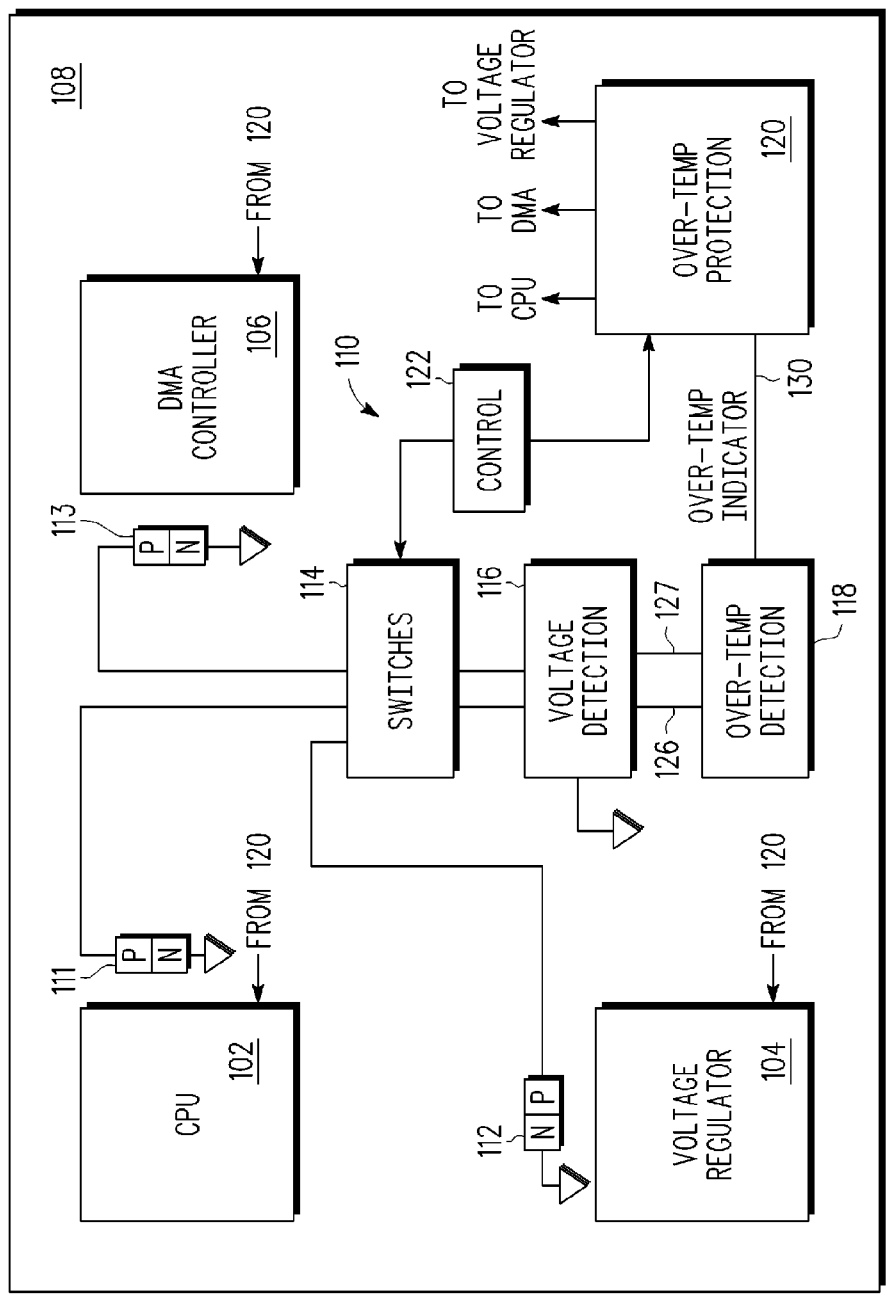
FIG. 1 is a block diagram illustrating an exemplary integrated circuit device employing a thermal monitoring system in accordance with at least one embodiment of the present disclosure.

In accordance with one aspect of the present disclosure, a method includes determining a first voltage across a first thermal detection device disposed at a first location of an electronic device in response to a first current at the first thermal detection device at a first time and determining a second voltage across the first thermal detection device in response to a second current at the first thermal detection device at a second time. The method further includes determining a first thermal characteristic of the first location of the electronic device based on a comparison of a third voltage representative of the second voltage to a fourth voltage representative of a difference between the second voltage and the first voltage. The method additionally includes adjusting, based on the first thermal characteristic and a threshold, an operation of a first circuit component of the electronic device associated with the first location.

In accordance with another aspect of the present disclosure, a device comprises a current source circuit having an output to separately provide a first current and a second current, and a first thermal detection device disposed at a first location of the device. The first thermal detection device is coupleable to the output of the current source circuit. The device further includes a voltage detection circuit comprising an input coupleable to the first thermal detection device and an output. The output is to provide a first indicator of a first voltage representative of a voltage at the first thermal detection device in response to the second current, and a second indicator of a second voltage representative of a voltage difference between the voltage at the first thermal detection device in response to the second current and a voltage at the first thermal detection device in response to the first current. The device further includes a temperature detection circuit having an input coupled to the output of the voltage detection circuit and an output to provide a first over-temperature indicator based on the first indicator and the second indicator.

In accordance with another aspect of the present disclosure, a method is provided for a device comprising a p-n junction disposed at a location of the device, the p-n junction having a p-type region with a first interconnect and a second interconnect coupled thereto and an n-type region with a third interconnect and a fourth interconnect coupled thereto. The method includes during a first phase: providing a first current to the p-type region via the first interconnect, a second current to the p-type region via the second interconnect, and a third current to the n-type region via the third interconnect, wherein the second current is substantially equal to the third current; and determining a first voltage across the second interconnect and the third interconnect in response to providing the first current, the second current and the third current. During a second phase, the method includes: providing a fourth current to the p-type region via the first interconnect, a fifth current to the p-type region via the second interconnect, and a sixth current to the n-type region via the third interconnect, wherein the fifth current is substantially equal to the sixth current; and determining a second voltage across the second interconnect and the third interconnect in response to providing the fourth current, the fifth current, and the sixth current. The method additionally includes determining a thermal characteristic of the location of the electronic device based on a comparison of a third voltage representative of the second voltage to a fourth voltage representative of a difference between the second voltage and the first voltage.

FIGS. 1-9 illustrate exemplary techniques for monitoring the thermal characteristics of an electronic device or other electronic system. Multiple thermal detection devices are distributed at various locations of the electronic system, where each thermal detection device, in one embodiment, is a single p-n junction, such as a diode or a diode-connected transistor. Thermal monitoring circuit switches a current flow through each thermal detection device to generate a voltage $V_{PTAT}$ that is proportional to the temperature (e.g., proportional to absolute temperature, or PTAT) of the thermal detection circuit. The voltage $V_{PTAT}$ is compared to a generated voltage $V_{CTAT}$ that is inversely proportional to the temperature (e.g., complementary to absolute temperature, or CTAT) of the thermal detection circuit. The use of a single p-n junction to measure the location temperature and generate the comparison threshold can reduce effects related to device mismatch, process variation and other non-idealities, thereby improving thermal monitoring precision. Based on the comparison between the voltage $V_{PTAT}$ and the voltage $V_{CTAT}$, an over-temperature indicator can be asserted or, alternately, deasserted. In response to the assertion of the over-temperature indicator, one or more components proximal to the monitored location can be disabled. Conversely, in response to the deassertion of the over-temperature indicator, one or more disabled proximal circuit components can be enabled.

The process of disabling an operation of a proximal circuit component, as used herein, refers to the process of completely disabling the proximal circuit component or a related component so that the proximal circuit component ceases all operations (e.g., by clock gating the proximal circuit component) and/or to the process of configuring the proximal circuit component or a related component so that the proximal circuit component performs one or more operations in a reduced performance state/reduced power dissipation state (e.g., by providing a reduced frequency clock to the proximal circuit component). Conversely, the process of enabling an operation of a proximal circuit component, as used herein, refers to the process of configuring the proximal circuit component or related component so that the proximal circuit component performs the operation in a normal performance state/normal power dissipation state (e.g., by ceasing clock gating or by providing a normal frequency clock to the proximal circuit component) and/or to the process of configuring the proximal circuit component or a related component so that the proximal circuit component performs one or more operations in an increased performance state (e.g., by providing an increased frequency clock to the proximal circuit component).

For ease of illustration, the exemplary techniques of the present disclosure are described in the context of thermal monitoring in an integrated circuit device, such as a system on a chip (SOC), an application specific circuit device (ASIC), a microprocessor, a microcontroller, and the like. However, these techniques can be similarly implemented in other electrical devices, such as, for example, printed circuit board systems (e.g., microcomputer motherboards), without departing from the scope of the present disclosure. To illustrate, the thermal monitoring circuit and a subset of the thermal detection circuits can be employed within an integrated circuit device, and a number of other thermal detection circuits are employed in peripheral devices while being monitored by the thermal monitoring circuit of the integrated circuit device. Further, although the exemplary techniques are described herein as using a single p-n junction as the thermal detection device, any of a plurality of thermal detection device types may be utilized as appropriate without departing from the scope of the present disclosure. Examples of other types of thermal detection devices that can be used include, but are not limited to, thermocouplers, resistance temperature detectors (RTDs), and the like.

Referring to FIG. 1, an exemplary integrated circuit (IC) device 100 is illustrated in accordance with at least one embodiment of the present disclosure. The IC device 100 can include, for example, a SOC, an ASIC, a microcontroller, a microprocessor, a digital signal processor (DSP), and the like. In the depicted example, the IC device 100 includes a plurality of device components, such as a central processing unit (CPU) 102, a voltage regulator 104, and a direct memory access (DMA) controller 106, disposed at a substrate 108. The IC device 100 further includes thermal monitoring circuit 110 to monitor the thermal characteristics of the IC device 100 during operation.

The thermal monitoring circuit 110 includes a plurality of thermal detection devices disposed at corresponding locations of the substrate 108. For purposes of illustration, the plurality of thermal detection devices are depicted in FIG. 1 as a p-n junctions 111-113. However, in other embodiments, the plurality of thermal detection devices may be implemented as any of a variety of thermal detection devices, such as thermocouplers or RTDs, or combinations thereof. In the illustrated example, the p-n junction 111 is disposed at a location proximal to the CPU 102, the p-n junction 112 is disposed at a location proximal to the voltage regulator 104, and the p-n junction 113 is disposed at a location proximal to the DMA controller 106. The thermal monitoring circuit 110 further includes a switching circuit 114, a voltage detection circuit 116, an over-temperature detection circuit 118, an over-temperature protection circuit 120 and a control circuit 122.

The switching circuit 114 includes a plurality of junction connections, each junction connection connected to the anode of a corresponding one of the p-n junctions 111-113. The switching circuit 114 further includes an output connection, whereby the switching circuit 114 is configured to selectively connect the anode of a selected one of the p-n junctions 111-113 to the output connection based on a control signal 126 provided by the control circuit 122. The voltage detection circuit 116 is connected to output connection of the switching circuit 114 and is configured to provide two voltages, voltage 126 and voltage 127, based on the sequential application of two or more currents to the selected p-n junction. The over-temperature detection circuit 118 is configured to assert or deassert an over-temperature indicator 130 based on the voltages 126 and 127. The over-temperature protection circuit 120 includes an input to receive the over-temperature indicator 130 and a plurality of outputs, each output connected to a corresponding one of the CPU 102, the voltage regulator 104, and the DMA controller 106. The over-temperature protection circuit 120 is configured to adjust the operation of the CPU 102, the voltage regulator 104 or the DMA controller 106 when the over-temperature indicator 130 indicates that there is an over-temperature condition at a corresponding p-n junction.

In operation, the control circuit 122 controls the switching circuit 114 to select one of the p-n junctions 111-113 for monitoring. As discussed in greater detail with reference to FIGS. 2-4, the voltage detection circuit 116 provides a first current to the selected p-n junction and determines the resulting voltage across the selected p-n junction. The voltage detection circuit 116 then provides another current to the selected p-n junction and determines the resulting voltage across the selected p-n junction. The over-temperature detection circuit 118 then compares the second voltage (or an attenuated representation thereof) with the difference between the first and second voltages (or an amplified representation thereof) to determine the thermal characteristic of the selected p-n junction, and therefore determines the thermal characteristic of the substrate 108 at the location of the selected p-n junction.

In the event that the determined thermal characteristic exceeds an identified upper threshold, the over-temperature detection circuit 118 asserts the over-temperature indicator 130. In response to the assertion of the over-temperature indicator 130, the over-temperature protection circuit 120 identifies the components proximal to the selected p-n junction (identified by the control circuit 122) and disables the proximal circuit components so as to reduce the generation of thermal energy at the corresponding location of the substrate 108. In the event that the determined thermal characteristic is below a lower threshold, the over-temperature detection circuit 118 deasserts the over-temperature indicator 130, if not already unasserted. In response to the deassertion of the over-temperature indicator 130, the over-temperature protection circuit 120 identifies the components proximal to the selected p-n junction and configures the proximal circuit components to be enabled or to revert to a normal state so as to be fully operational. Further, as discussed in greater detail herein, the upper threshold and the lower threshold can be adjusted by adjusting an attenuation factor applied to the second voltage, by adjusting a gain factor applied to the difference between the second voltage and the first voltage, or both.

Figure 2:
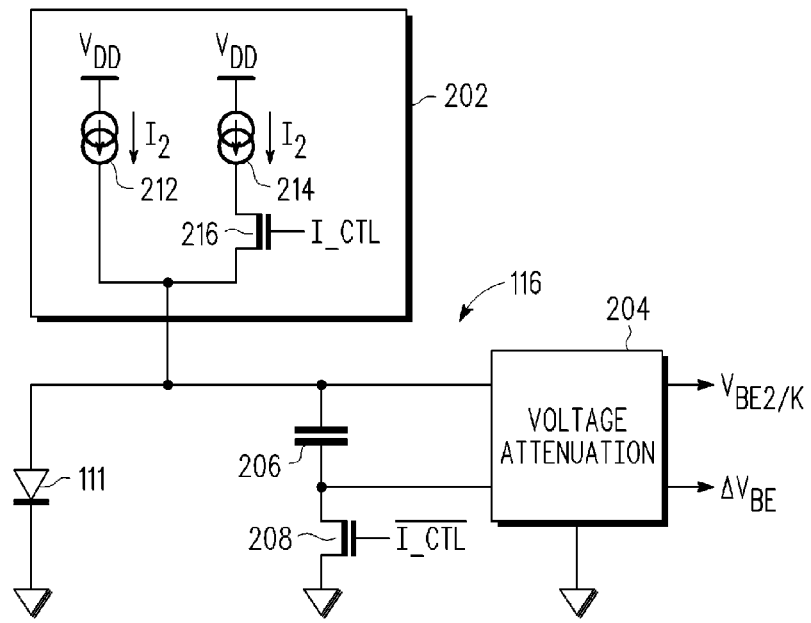
FIG. 2 is a diagram illustrating an exemplary implementation of the thermal monitoring system of FIG. 1 in accordance with at least one embodiment of the present disclosure.
Figures 3, 4:
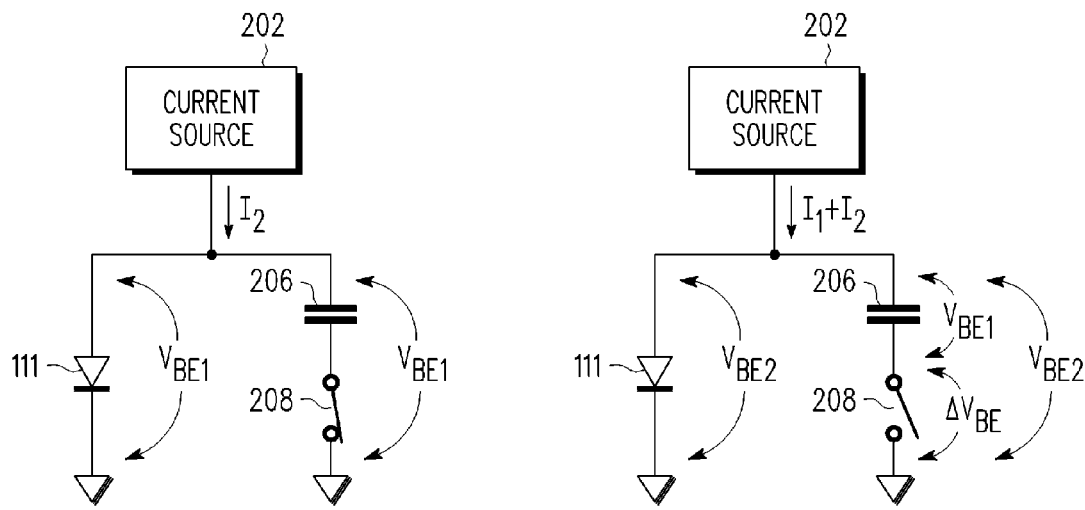
FIGS. 3 and 4 are block diagrams illustrating an exemplary operation of the implementation of the thermal monitoring system of FIG. 2 in accordance with at least one embodiment of the present disclosure.

Referring to FIGS. 2-4, a simplified implementation of the voltage detection circuit 116 of FIG. 1 and its operation are illustrated in accordance with at least one embodiment of the present disclosure. For purposes of discussion, the voltage detection circuit 116 is described in FIGS. 2-4 in the context of monitoring a single p-n junction (p-n junction 111). However, as described herein with reference to FIGS. 5 and 9, similar principles are applied for multiple p-n junctions serving as thermal sensors.

In the depicted example, the voltage detection circuit 116 includes a current source circuit 202, a voltage attenuation circuit 204, and a voltage subtractor represented by a capacitor 206 and a switch transistor 208 (or other type of switch). The current source circuit 202 includes a current source 212 to generate a current $I_1$ and a current source 214 to generate a current $I_2$, where the current $I_2$ is greater than the current $I_1$ for the purposes of this example. The current source circuit 202 further includes a switch transistor 216 connected in series between the output of the current source 214 and the output of the current source circuit 202, where the transistor 216 is enabled and disabled based on the control signal I_CTL. The output of the current source circuit 202 is connected to the anode of the p-n junction 111.

The capacitor 206 includes an electrode connected to the anode of the p-n junction 111 and an electrode connected to a current electrode of the switch transistor 208. The other current electrode of the switch transistor 208 is connected to the voltage reference (e.g., GND) of the cathode of the p-n junction 111. The control electrode of the switch transistor 208 receives an inverted representation of the control signal I_CTL that enables and disables current flow through the switch transistor 208.

The voltage attenuation circuit 204 includes an input connected to the electrode of the capacitor 206 connected to the anode of the p-n junction 111, and another input connected to the node between the capacitor 206 and the switch transistor 208. The voltage attenuation circuit 204 further includes two voltage outputs, one to provide an indicator of a voltage $V_{BE2}$ or an attenuated representation thereof, and one to provide an indicator of a voltage $\Delta V_{BE}$ or an amplified representation thereof, discussed in greater detail herein.

Referring to FIGS. 3 and 4, an exemplary operation of the voltage detection circuit 116 of FIG. 2 is illustrated in accordance with at least one embodiment of the present disclosure. As illustrated by FIG. 3, during a first detection phase, the control signal I_CTL is unasserted, thereby causing the current at the output of the current source circuit 202 to be the current $I_1$ generated by the current source 212 (FIG. 2) and the switch transistor 208 to act as a closed switch. Accordingly, the current $I_1$ passes through the p-n junction 111, creating a voltage $V_{BE1}$ across the p-n junction 111 as well as across the capacitor 206 and the switch transistor 208 in series.

As illustrated by FIG. 4, during a second detection phase, the control signal I_CTL is asserted, thereby causing the current at the output of the current source circuit 202 to be the sum of current $I_1$ and current $I_2$ generated by the current source 212 and the current source 214 (FIG. 2). Further, the asserted state of I_CTL causes the switch transistor 208 to act as an open switch. The sum current passes through the p-n junction 111, causing a voltage $V_{BE2}$ across the p-n junction 111. Further, because the switch transistor 208 acts as an open switch during the second detection phase and because the capacitor 206 stores the voltage $V_{BE1}$ across its electrodes due to the first detection phase, the voltage across the switch transistor 208 is the difference between the voltage $V_{BE2}$ and the voltage $V_{BE1}$, or $\Delta V_{BE}$.

It will be appreciated that the voltage $V_{BE1}$ and the voltage $V_{BE2}$ are represented by the equations:

$$V_{BE1} = \frac{k*T}{q}\ln\left(\frac{I_1}{I_s}\right) \quad \text{EQ. 1}$$

$$V_{BE2} = \frac{k*T}{q}\ln\left(\frac{I_1+I_2}{I_s}\right) \quad \text{EQ. 2}$$

where k represents the Boltzman constant, q represents the electron charge, $I_S$ represents the junction saturation current of the p-n junction 111, and T represents the junction temperature in units Kelvin. From Equations 1 and 2, it can be observed that $$\Delta V_{BE} = \frac{k*T}{q}\ln\left(\frac{I_1+I_2}{I_1}\right) \quad \text{EQ. 3}$$

Thus, from Equation 3 it will be appreciated that the voltage $\Delta V_{BE}$ is a voltage proportional to the absolute temperature (PTAT) because, assuming that the currents $I_1$ and $I_2$ remain substantially constant, the voltage $\Delta V_{BE}$ is only dependent on physical constants and on the absolute temperature T of the p-n junction 111. Further, the conversely proportional to absolute temperature (CTAT) characteristic of the voltage $V_{BE2}$, assuming a constant collector current $I_c$, can be expressed by the equation:

$$V_{BE2}|_{I_C=const} = V_{go} * \left(1 - \frac{T}{T_r}\right) + V_{BE2r} * \left(\frac{T}{T_r}\right) \qquad \text{EQ. 4}$$

where $V_{go}$ represents the Si gap voltage at zero Kelvin, $T_r$ represents the reference temperature, and $V_{BE2r}$ represents the voltage across the p-n junction at the reference temperature. As discussed in greater detail herein, the PTAT characteristic of the voltage difference $\Delta V_{BE}$ and the CTAT characteristic of the voltage $V_{BE2}$ can be used to monitor a specific temperature threshold for asserting and deasserting the over-temperature indicator 130 (FIG. 1) for thermal protection purposes.

Figure 5:
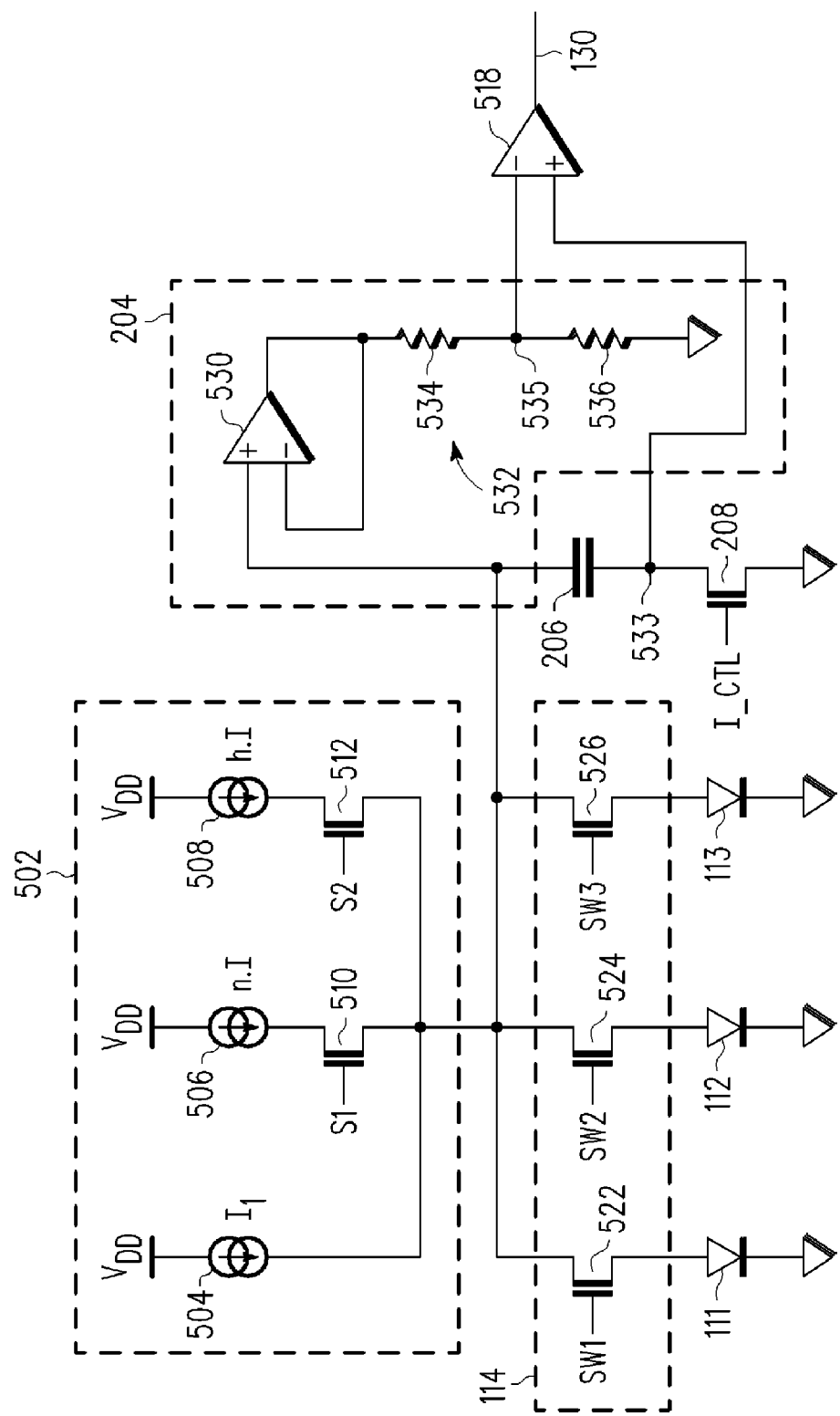
FIG. 5 is a diagram illustrating another exemplary implementation of the thermal monitoring system of FIG. 1 in accordance with at least one embodiment of the present disclosure.

Referring to FIG. 5, an exemplary multiple-sensor implementation of the switching circuit 114, the voltage detection circuit 116 and the over-temperature detection circuit 118 of the thermal monitoring circuit 110 of FIG. 1 is illustrated in accordance with at least one embodiment of the present disclosure. In the depicted implementation, the over-temperature detection circuit includes a current source circuit 502 (similar to the current source circuit 202, FIG. 2) and the voltage attenuation circuit 204.

The current source circuit 502 includes three current sources, current source 504, current source 506, and current source 508, to generate currents $I_1$, $I_2$ and $I_3$, respectively, where $I_2$ equals $n*I_1$ and $I_3$ equals $h*I_1$. The current source circuit 502 also includes switch transistor 510 and switch transistor 512 connected in series between the outputs of current sources 506 and 508, respectively. The switch transistor 510 is enabled and disabled responsive to a control signal S1 and the switch transistor 512 is enabled and disabled responsive to a control signal S2.

The switching circuit 114 includes an input connected to the output of the current source circuit 502 and a plurality of outputs, each output connected to a corresponding one of the p-n junctions 111-113, where the input of the switching circuit 114 is selectively connected to one of the outputs via the switch transistors 522, 524 and 526, which are enabled and disabled via control signals SW1, SW2 and SW3, respectively.

In the illustrated example, the first electrode of the capacitor 206 is connected to the input of the switching circuit 114 (and therefore connected to the anode of the p-n junction selected by the switching circuit 114) and the second electrode is connected to a node 533, which is connected to one of the current electrodes of the switch circuit 208, as discussed with reference to FIG. 2. Thus, the capacitor 206 and switch transistor 208 operates as a single voltage sensor shared by the plurality of p-n junctions 111-113. Although FIG. 5 illustrates a particular implementation with three thermal detection devices (p-n junctions 111-113) to monitor three respective locations of an IC device, it will be appreciated that additional locations can be monitored by implementing additional p-n junctions and switches, or that fewer locations can be monitored by implementing fewer p-n junctions and switches.

The voltage attenuation circuit 204 includes a voltage-follower operational amplifier (op-amp) 530 and a voltage divider 532. The voltage-follower op-amp 530 includes a first signal input connected to the input of the switching circuit 114 (and therefore connected to the anode of the p-n junction selected by the switching circuit 114) and a second signal input connected to the output of the voltage-follower op-amp 530. The voltage divider 532 includes resistors 534 and 536. The resistor 534 includes an electrode connected to the output of the voltage-follower op-amp 530 and an electrode connected to a node 535. The resistor 536 includes an electrode connected to the node 535 and an electrode connected to the voltage reference (e.g., GND) to which the cathodes of the p-n junctions 111-113 are connected. It will be appreciated that the voltage divider 532 attenuates the voltage at the output of the voltage-follower op-amp 530 by an attenuation factor K ($K=R_1/(R_0+R_1)$), where $R_0$ represents the resistance of resistor 534 and $R_1$ represents the resistance of resistor 536. Further, in one embodiment, one or both of the resistors 534 and 536 may be programmed or otherwise adjusted (e.g., as variable resistors or as resistor networks having selectable resistances via one or more switches) so as to adjust the attenuation factor K.

In the illustrated example, the over-temperature detection circuit 118 is implemented as a comparator 518 having a first signal input connected to the node 533, a second signal input connected to the node 535 and an output to provide either an asserted value or an unasserted value for the over-temperature indicator 130 based on a comparison of the voltage at the node 533 to the voltage at the node 535. In one embodiment, instead or in addition to the attenuation circuit formed by the voltage divider 532, the voltage attenuation circuit 204 includes an amplifier circuit (not shown) connected in series between the node 533 and the first signal input of the comparator 518, whereby a gain factor G of the amplification circuit can be programmed or otherwise adjusted.

In order to determine the thermal characteristic of the substrate 108 (FIG. 1) at a particular location, the p-n junction at the particular location is tested in two phases. During the first phase, switch transistors 510 and 512 are disabled so as to act like open switches and switch transistor 208 is enabled so as to act like a closed switch. As a result, the current $I_1$ is supplied to the anode of the selected p-n junction, which results in the voltage $V_{BE1}$ across the capacitor 206 and the switch transistor 208. During the second phase, switch transistor 510 is enabled so as to act as a closed switch and switch transistors 208 and 512 are disabled so as to act like open switches. As a result, the current $I_2$ is supplied to the anode of the selected p-n junction, which results in the voltage $V_{BE2}$ across the capacitor 206 and the switch transistor 208, where the voltage across the switch transistor 208 is the voltage $\Delta V_{BE}$. The switch transistor 512 allows the current to be increased during the second phase of the $\Delta V_{BE}$. If this switch is enabled during the second phase the current increase allows the detection of a smaller temperature threshold, which allows the implementation of a hysteretic function. The control of the relation between the currents of the two operating phases can permit simplified control of the detected temperature threshold.

The circuit formed by the voltage-following op-amp 530 and the resistors 534 and 535 attenuates the voltage $V_{BE2}$ by the attenuation factor K ($K=R_1/(R_0+R_1)$) to provide an attenuated voltage $V_{BE2'}$. The comparator op-amp 518 compares the voltage $\Delta V_{BE}$ with the voltage $V_{BE2'}$ and asserts or deasserts its output (i.e., the over-temperature indicator 130) in response to the comparison. In addition to, or instead of, attenuating the voltage $V_{BE2}$, in an alternate embodiment the voltage $\Delta V_{BE}$ can be amplified by the gain factor G (e.g., G=1/K) to generate an amplified voltage $\Delta V_{BE'}$. The amplified voltage $\Delta V_{BE'}$ is compared to the voltage $V_{BE2}$ (or, alternately, the attenuated voltage $V_{BE2'}$) in order to determine the correct temperature threshold. Thus, by the end of the second phase, the over-temperature indicator 130 is in a valid state for processing by the over-temperature protection circuit 120 (FIG. 1).

The detected temperature thresholds are controlled through the attenuation factor K, or alternatively, the gain factor G, which can be programmed or otherwise adjusted using switches or other electronic techniques so as to adjust the hysteresis thresholds. Additionally, the thresholds can be changed by controlling the current $I_2$ passing through the p-n junction. This enables the use of adjustable thresholds and the implementation of hysteresis, that is, the change of the threshold to a lower level when the over-temperature indicator is asserted.

In the exemplary circuit implementation, in the event that the over-temperature indicator 130 is asserted, thereby indicating an over-temperature characteristic of the substrate 108, hysteresis is performed for a p-n junction the next time the p-n junction is selected for monitoring. In this condition, both switch transistors 510 and 512 are enabled, thereby resulting in the current $I_3$ being provided to the anode of the selected p-n junction, which results in a voltage $V_{BE2-2}$ across the capacitor 206 and the switch transistor 208 and a corresponding voltage $\Delta V_{BE-2}$ across the switch transistor 208. The voltage $V_{BE-2}$ is attenuated to generate the voltage $V_{BE-2'}$, which is compared with the voltage $\Delta V_{BE2-2}$ by the comparator op-amp 518 so as to keep the over-temperature indicator 130 asserted or to deassert the over-temperature indicator 130 based on the comparison.

Figure 6:
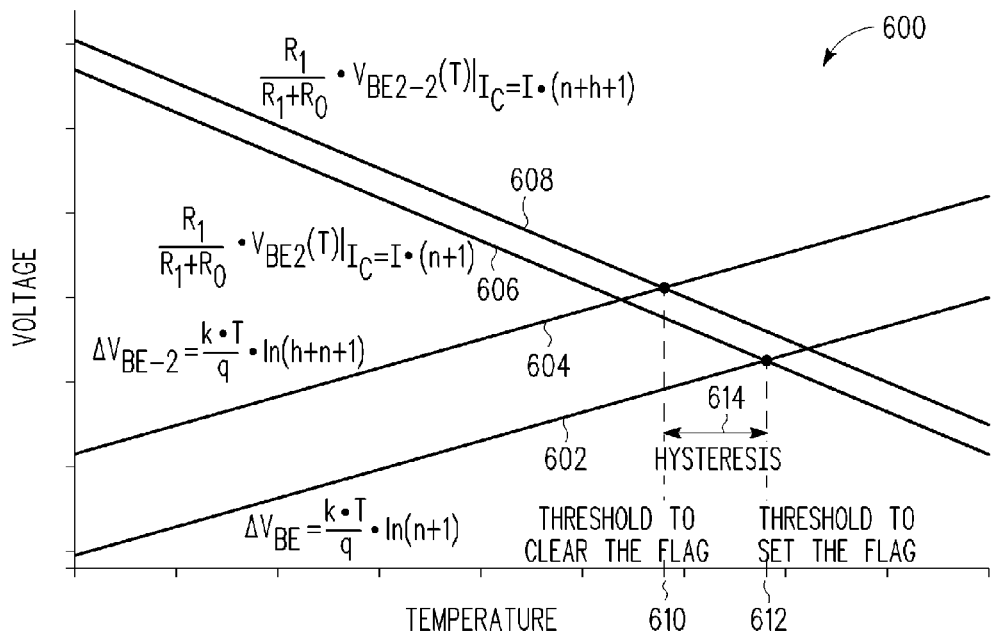
FIG. 6 is a chart illustrating exemplary thresholds and hysteresis conditions of the implementation of FIG. 5 in accordance with at least one embodiment of the present disclosure.

Referring to FIG. 6, a voltage-temperature chart 600 illustrating an exemplary operation of the circuit implementation of FIG. 5 is illustrated in accordance with at least one embodiment of the present disclosure. The ordinate of the voltage-temperature chart 600 represents voltage and the abscissa represents temperature (Kelvin). The chart line 602 represents the voltage $\Delta V_{BE}$, the chart line 604 represents the voltage $\Delta V_{BE-2}$, the chart line 606 represents the voltage $V_{BE2'}$ and the chart line 608 represents the voltage $V_{BE2-2'}$. As illustrated by FIG. 6, point 610 where the chart line 604 and the chart line 608 intersect (i.e., where $\Delta V_{BE-2}=V_{BE2-2'}$) represents the lower temperature threshold at which the over-temperature indicator 130 is cleared (i.e., deasserted). Conversely, point 612 where the chart line 602 and the chart line 606 intersect (i.e., where $\Delta V_{BE}=V_{BE2'}$) represents the upper temperature threshold at which the over-temperature indicator 130 is set (i.e., asserted). Accordingly, the temperature range 614 represents the hysteresis of the circuit implementation of FIG. 5. Thus, the current value $I_2$ can be selected so as to provide the desired thresholds and hysteresis for the circuit implementation of FIG. 5, thereby reducing or eliminating oscillation of the over-temperature indicator 130 (FIG. 5) due to small changes in the temperature proximal to the sensors. Further, it will be appreciated from the voltage-temperature chart 600 that the attenuation factor K used to generate the voltage $V_{BE2'}$ or the gain factor G used to generate the voltage $\Delta V_{BE}$ can be used to adjust the lower temperature threshold or the upper threshold as appropriate.

Figure 7:
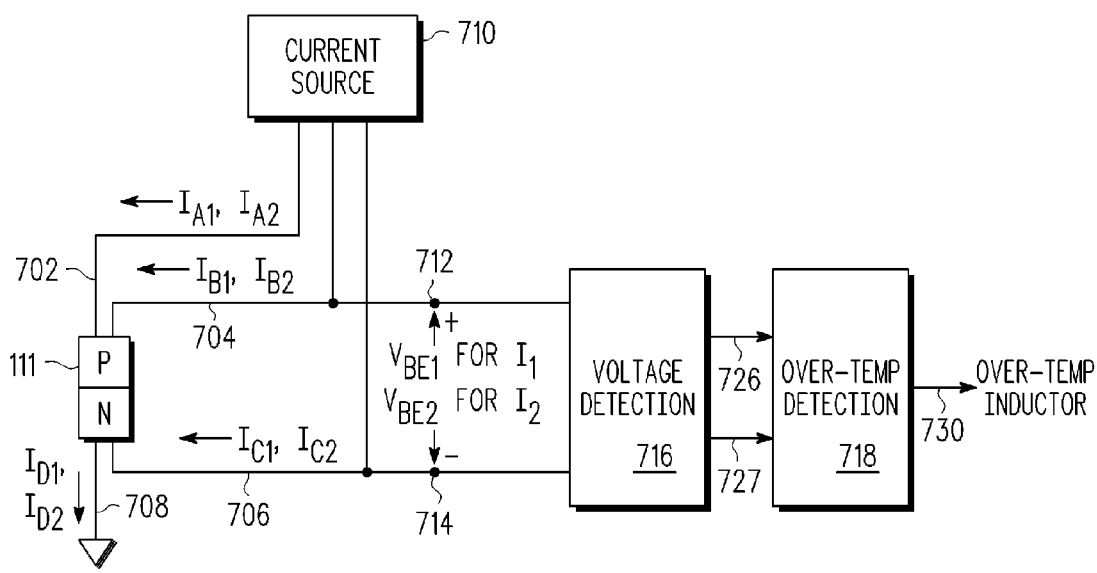
FIG. 7 is a diagram illustrating thermal monitoring technique having improved precision in the presence of parasitic resistance in accordance with at least one embodiment of the present disclosure.

Referring to FIG. 7, a thermal monitoring system 700 and technique for reducing or eliminating errors introduced by the interconnects for the p-n junctions 111-113 of the thermal monitoring circuit 100 (FIG. 1) are illustrated in accordance with at least one embodiment of the present disclosure. It will be appreciated that the parasitic resistances of the interconnects between the p-n junction being monitored and the remainder of the thermal monitoring circuit 100 may result in decreased precision due to the current-dependent voltage drops they introduce. The thermal monitoring system 700 compensates for these parasitic resistances, thereby reducing or eliminating the effects of the voltage drops they introduce.

In the illustrated example, the thermal monitoring system 700 includes a thermal detection device, such as the p-n junction 111, disposed at a location of an integrated circuit to be monitored for over-temperature conditions. The thermal monitoring system 700 further includes interconnect 702 and interconnect 704 connected to the anode terminal of the p-n junction 111 and interconnects 706 and 708 connected to the cathode terminal of the p-n junction 111. The interconnects 702, 704, and 706 are connected to a current source circuit 710 (similar to, for example, the current source circuit 202, FIG. 2) so as to source current to anode of the p-n junction 111 and the interconnect 708 is connected to, for example, ground or another voltage reference so as to source current from the cathode of the p-n junction 111. The interconnects 704 and 706 also are connected to voltage detection circuit 716 (similar to, for example, the voltage detection circuit 116, FIG. 1) for detecting voltages differences across the interconnects 704 and 706 as the voltages $V_{BE1}$ and $V_{BE2}$ as described above, and further for providing voltages 726 and 727 representing the voltages $V_{BE2}$ and $\Delta V_{BE}$, respectively, to over-temperature detection circuit 718 (similar to, for example, the over-temperature detection circuit 118, FIG. 1) for detecting an over-temperature condition based on a comparison of the voltages 726 and 727 as described above, and for asserting or deasserting an over-temperature indicator 730 (similar to, for example, the over-temperature indicator 130, FIG. 1) in response to the comparison of the voltages 726 and 727. As with the implementations of FIGS. 1-6, the voltage 726 can be the voltage $V_{BE2}$, or the voltage detection circuit 716 can include an attenuation circuit to attenuate the voltage $V_{BE2}$ by an attenuation factor K to generate the voltage 726. Likewise, the voltage 727 can be the voltage $\Delta V_{BE}$, or the voltage detection circuit 716 can include an amplification circuit to amplify the voltage $\Delta V_{BE}$ by a gain factor G to generate the voltage 727. Likewise, as discussed above, the attenuation factor K, the gain factor G, or both, can be programmable or otherwise adjusted so as to adjust the thresholds at which the over-temperature indicator 730 is asserted or deasserted so as to implement a hysteretic function.

In operation, the thermal monitoring system 700 is operated in a manner similar to the manner described with respect to FIG. 5, whereby two phases are employed. In one embodiment, the interconnects 704 and 706 present matched resistances for and carry substantially equal currents to the p-n junction 111 so that, during operation, the voltage across the terminals 712 and 714 of the interconnects 704 and 706 is substantially equal to the voltage drop across the p-n junction 111 despite the presence of parasitic resistance in the interconnects 704 and 706. Accordingly, during the first phase, the current source circuit 710 sources a current $I_1$ to the anode of the p-n junction 111, where the current $I_1$ is divided between the interconnects 702 and 704 (as currents $I_{A1}$ and $I_{B1}$, respectively) and the current source circuit 710 sources current $I_{C1}$ to the cathode of the p-n junction 111, whereby the current $I_{C1}$ is substantially equal to the current $I_{B1}$ (using, e.g., a current mirror at the current source circuit 710). The sum of the currents, $I_{D1}=I_{A1}+I_{B1}+I_{C1}$, is sourced from the cathode of the p-n junction 111 via the interconnect 708. The voltage across the terminals 712 and 714 is detected by the voltage detection circuit 716 as the voltage $V_{BE1}$ and stored in an analog memory (e.g., the configuration of the capacitor 206 and the switch 208, FIG. 2).

During the second phase, the current source circuit 710 sources a current $I_2$ to the anode of the p-n junction 111, where the current $I_2$ is divided between the interconnects 702 and 704 (as currents $I_{A2}$ and $I_{B2}$, respectively) and the current source circuit 710 sources a current $I_{C2}$ to the cathode of the p-n junction 111, whereby the current $I_{C2}$ is substantially equal to the current $I_{B2}$. The sum of the currents, $I_{D2}=I_{A2}+I_{B2}+I_{C2}$, is sourced from the cathode of the p-n junction 111 via the interconnect 708. The voltage across the terminals 712 and 714 is detected by the voltage detection circuit 716 as the voltage $V_{BE2}$ and stored in the analog memory. The voltage detection circuit 716 then provides the detected voltage $V_{BE2}$ (or an attenuated representation thereof) as the voltage 726 and provides the difference between the voltage $V_{BE2}$ and the voltage $V_{BE1}$ (or an amplified representation thereof) as the voltage 727. The over-temperature detection circuit 718 then can determine the thermal characteristic of the location of the device at which the p-n junction 11 is located and assert or deassert the over-temperature indicator 730 accordingly based on a comparison of the voltages 726 and 727 as described above with minimized or eliminated errors due to parasitic resistance.

Figure 8:
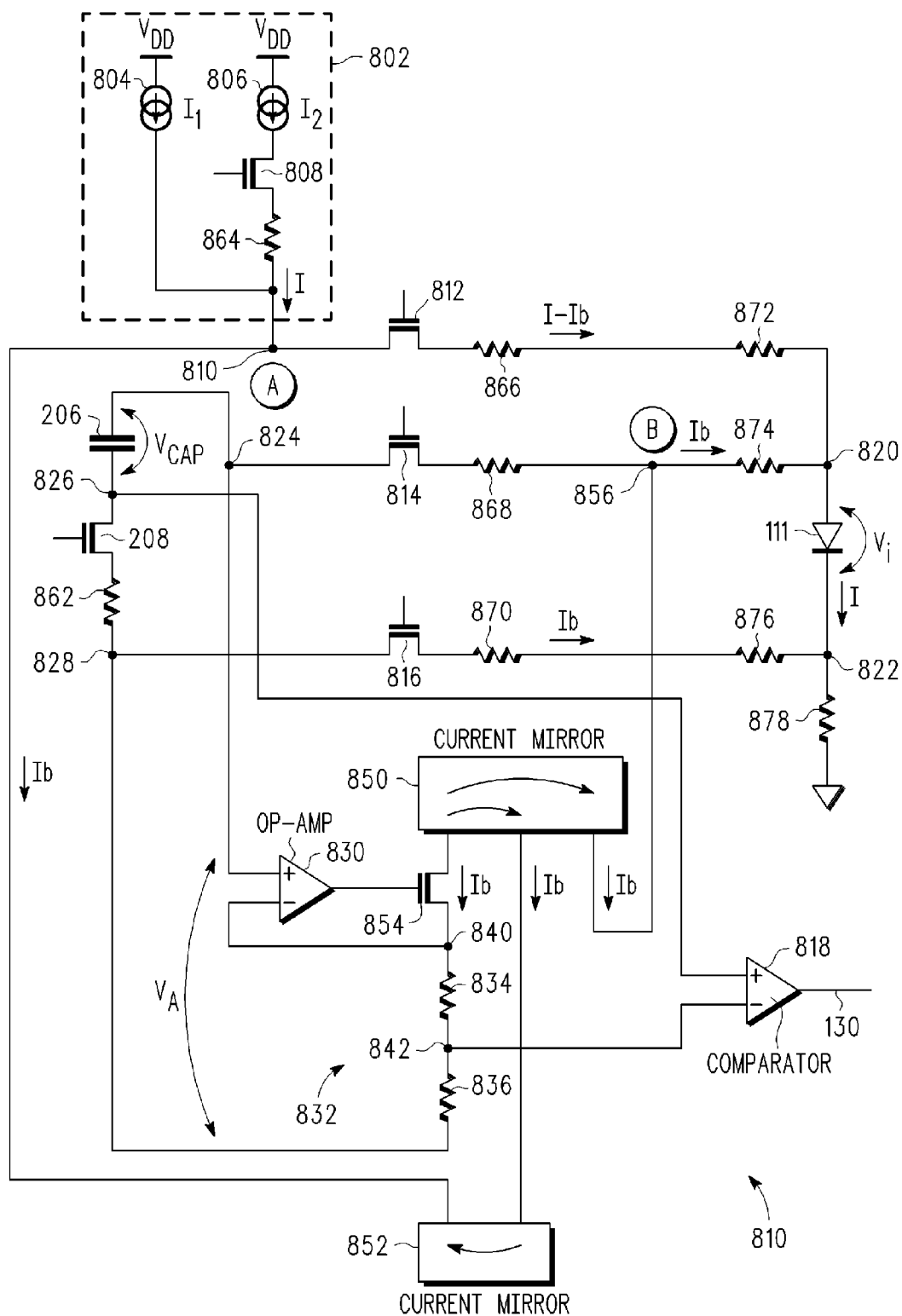
FIG. 8 is a diagram illustrating a particular circuit implementation of the thermal monitoring technique of FIG. 7 in accordance with at least one embodiment of the present disclosure.

Referring to FIG. 8, a particular circuit implementation of the thermal monitoring circuit 110 based on the technique of the thermal monitoring system 700 of FIG. 7 is illustrated in accordance with at least one embodiment of the present disclosure. In the depicted example, the thermal monitoring circuit 110 includes current source circuit 802 having a first current source 804 to provide a current $I_1$ and a second current source 806 to provide a second current $I_2$, where the output of the current source circuit 802 is current $I_1$ when the switch transistor 808 is disabled and is current $I_1+I_2$ when the switch transistor 808 is enabled. The output of the current source circuit 802 is connected to a node 810. A switch transistor 812 includes a current electrode connected to the node 810 and a current electrode connected to the anode (node 820) of the p-n junction being monitored (e.g., p-n junction 111). A switch transistor 814 includes a current electrode connected to the anode (node 820) of the p-n junction 111 and a current electrode connected to one electrode (node 824) of the capacitor 206. A switch transistor 816 includes a current electrode connected to the cathode (node 822) of the p-n junction 111 and a current electrode connected to an electrode (node 828) of the switch transistor 208.

The thermal monitoring circuit 110 further includes a voltage-follower op-amp 830 (similar to the voltage-follower op-amp 530, FIG. 5) and a voltage divider 832. The voltage-follower op-amp 830 includes a first signal input connected to a node 824 and a second signal input connected to a node 840. The voltage divider 832 includes resistors 834 and 836, whereby the resistor 834 has an electrode connected to the node 840 and an electrode connected to a node 842 and the resistor 836 has an electrode connected to the node 842 and an electrode connected to the node 828. The thermal monitoring circuit 110 further includes current mirrors 850 and 852 and transistor 854. The current mirror 850 includes a first current input connected to one current electrode of the transistor 854, a second current input connected to a node 856, and third current input, where the currents at the second and third current inputs are substantially equal to the current of the first current input. The other current electrode of the transistor 854 is connected to the node 840 and the control electrode of the transistor 854 is connected to the output of the voltage-follower op-amp 830. The current mirror 852 includes a first current input connected to the second current input of the current mirror 850, and a second current input connected to the node 810, where the current at the second current input is substantially equal to the current at the first current input. The thermal monitoring circuit 110 further includes a comparator op-amp 818 (similar to the comparator op-amp 518, FIG. 5) having a first signal input connected to a node 826 between the capacitor 206 and the switching transistor 208 and a second signal input connected to the node 842. The comparator op-amp 818 further includes an output to provide an asserted value or an unasserted value for the over-temperature indicator 130 based on a comparison of the voltage at the node 826 to the voltage at the node 842.

The implementation of FIG. 8 is operated in a manner similar to the manner described with respect to FIG. 5, whereby two phases are employed. During the first phase, the current $I_1$ is applied to the p-n junction 111, causing a voltage $V_{BE1}$ across the capacitor 206 and the switch transistor 208. During the second phase, the current $I_1+I2$ is applied to the p-n junction 111, causing a voltage $V_{BE2}$ across the capacitor 206 and the switch transistor 208, where the switch transistor 208 has a voltage drop equal to $\Delta V_{BE}$. The voltage $V_{BE2'}$ resulting from the attenuation by the op-amp 830 and the voltage divider 832 is compared with the voltage $\Delta V_{BE}$ at the comparator 818, which asserts or deasserts the over-temperature voltage indicator 130 in response to the results of the comparison.

However, it will be appreciated that the interconnections between the p-n junctions and the remainder of the over-temperature circuit 110 may introduce errors due to parasitic resistances, thereby reducing the precision. To illustrate, resistances 862, 864, 866, 868 and 870 represent the resistances of the transistors 208, 808, 812, 814, and 816, respectively, when enabled. Similarly, the resistances 872, 874, 876 and 878 represent the inherent resistance of the interconnections between the monitoring circuit and the p-n junction 111. However, the implementation illustrated in FIG. 8 is configured to reduce or eliminate the negative effects caused by these parasitic resistances. To illustrate, the sum of the voltage drops across the capacitor 206, the resistance 868, the resistance 874, the p-n junction 111, the resistance 876, the resistance 870 and the resistance 862 when the capacitor 206 is charged is represented by the equation:

$$V_{cap} = V_a = V_j + I_b^*(R_{p2} - R_{p3} - R_{d4}) \qquad \text{EQ. 5}$$

where $V_a$ represents the voltage between the first signal input of the voltage-follower op-amp 830, $V_j$ represents the voltage across the p-n junction 111, $I_b$ represents the current through the current inputs of the current mirrors 850 and 852, $R_{p2}$ represents the resistance 874, $R_{p3}$ represents the resistance 876, and $R_{d4}$ represents the resistance 870. Assuming that $R_{p2}$ is approximately equal to $R_{p3}$, which typically is reasonable if the connections are substantially similar, Equation 5 reduces to:

$$V_{cap} = V_a = V_j - I_b^* R_{d4} \qquad \text{EQ. 6}$$

Using Equations 1-6, the following relationship is determined:

$$\Delta V_{BE} = V_a - V_{cap} = \frac{\frac{k*T}{q}\ln(n+1)}{\beta}, \qquad \text{EQ. 7}$$

where $$\beta = 1 + \frac{R_{d4}}{R_0 + R_1}$$

where $R_0$ represents the resistance of resistor 834 and R1 represents the resistance of resistor 836. When $\Delta V_{BE}$ is compared to $V_a$ (after attenuation by the voltage-follower op-amp 830 and the voltage divider 832), the following equation is determined from Equations 1-7:

$$V_{BE}|_{I_C=I*(n+1)} * a = \frac{k*T}{q}\ln(n+1) \qquad \text{EQ. 8}$$

Thus, as illustrated by Equation 8, the implementation of FIG. 8 can effectively reduce or eliminate the effect of the parasitic resistances resulting from the interconnects and the switch transistors.

Figure 9:
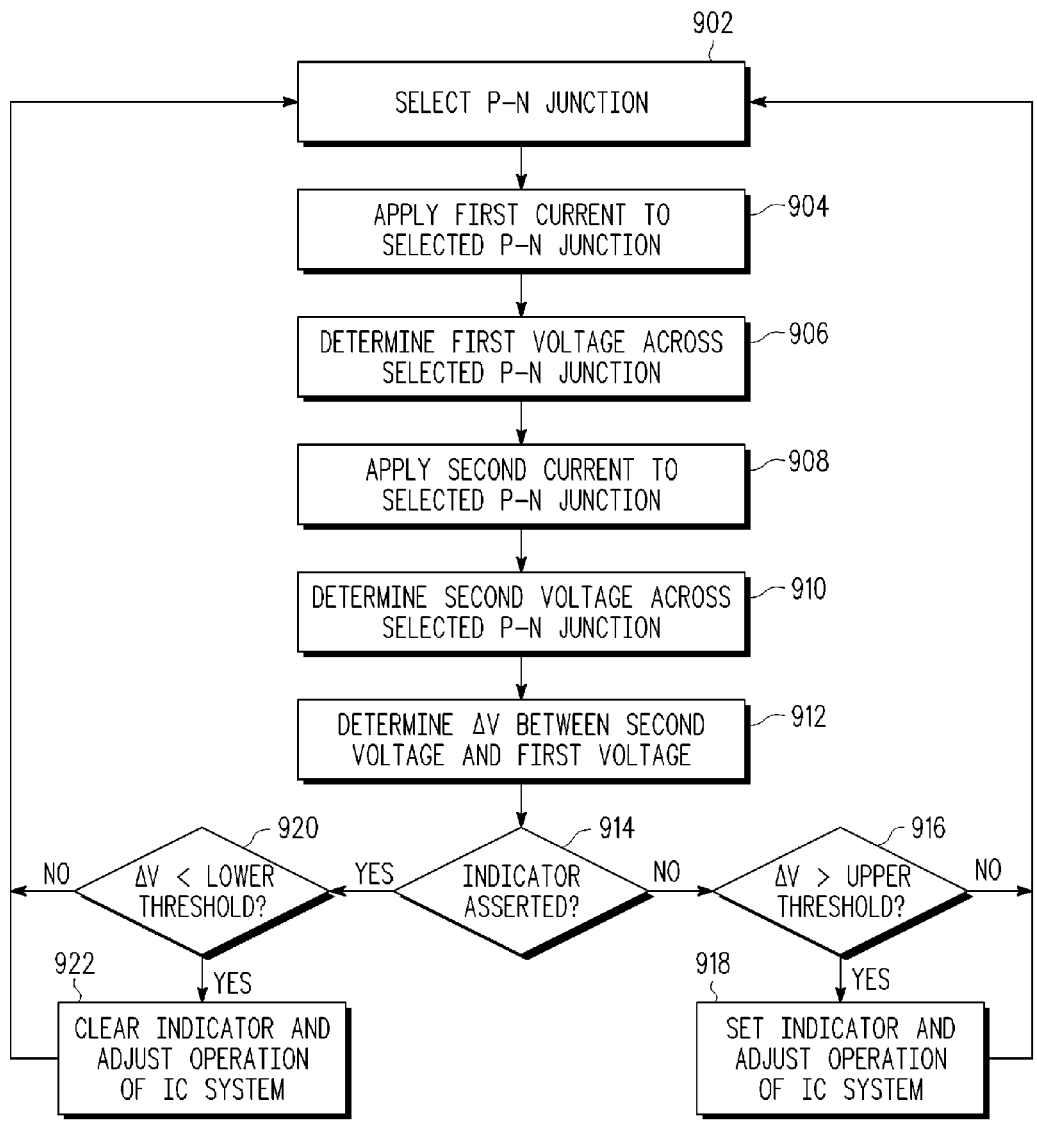
FIG. 9 is a flow diagram illustrating an exemplary method for thermal monitoring of an integrated circuit device in accordance with at least one embodiment of the present disclosure.

Referring to FIG. 9, an exemplary method 900 for monitoring multiple substrate locations of an IC system is illustrated in accordance with at least one embodiment of the present disclosure. The method 900 includes selecting one of a plurality of p-n junctions disposed at various substrate locations for thermal monitoring at block 902. At block 904, the method 900 includes applying a first current to the selected p-n junction. In the event that the IC system implements a thermal monitoring system as illustrated in FIG. 7, the method 900 further can include applying additional matching currents to the p-type region and the n-type region, respectively, of the selected p-n junction so as to reduce parasitic resistance effects as describe with reference to FIG. 7. At block 906, the method 900 includes determining a first voltage across the selected p-n junction as a result of the application of the first current. As discussed above, determining the first voltage can include charging a capacitor connected between the anode of the p-n junction and the voltage reference of the cathode of the p-n junction via a switch transistor, where the voltage drop across the capacitor and the switch transistor (in an enabled state) represents the first voltage.

At block 908, the method 900 includes applying a second current, higher than the first current, to the selected p-n junction at block 902. The method 900 further can include providing matching currents to the p-type region and n-type region, respectively, at block 908 for implementations corresponding to the thermal monitoring system 700 of FIG. 7. At block 910, the method 900 includes determining a second voltage across the selected p-n junction. As noted above, the second voltage can be determined as the voltage across the capacitor and the switch transistor (in a disabled state). The method 900 further includes determining the voltage difference between the first voltage and the second voltage at block 912. In one embodiment, the voltage difference is represented as the voltage drop across the switch transistor in a disabled state.

At block 914, the method 900 includes determining whether an over-temperature indicator is already asserted. If not, the method 900 flows to block 916, where the voltage difference is compared to an upper threshold. If the voltage difference is greater than the upper threshold, the method 900 includes asserting the over-temperature indicator and adjusting the operation of the IC system at block 918 so as to reduce thermal output at the substrate location associated with the selected p-n junction. The adjustment to the operation of the IC system can include, for example, adjusting an operation of one or more components of the IC system so as to reduce their thermal output (e.g., by clock gating or providing a reduced-speed clock signal to the one or more components). Otherwise, if the voltage difference is less than the upper threshold, the over-temperature indicator remains in its unasserted state. In response to the unasserted state of the over-temperature indicator, the operation of the IC system can remain at its current state, or alternately, one or more components of the IC system can be adjusted so as to improve their operating performance (e.g., by increasing the speed of the clock signal provided to a component of the IC system). The flow of method 900 then returns to block 902, where another p-n junction is selected for monitoring.

If the over-temperature indicator is determined to be set at block 914, the method 900 includes comparing the voltage difference to a lower threshold at block 920. If the voltage difference is less than the second threshold, the method 900 includes deasserting the over-temperature indicator and adjusting the operation of the IC system at block 922 so as to enable the components associated with the substrate location to be fully operational or to increase the operating speeds of the components associated with the substrate location. Otherwise, if the voltage difference is greater than the lower threshold, the over-temperature indicator remains in its asserted state and the flow returns to block 902, where another p-n junction is selected for monitoring.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A device comprising:
   a current source circuit having an output to separately provide a first current and a second current;
   a first thermal detection device disposed at a first location of the device, the first thermal detection device coupleable to the output of the current source circuit;
   a voltage detection circuit comprising an input coupleable to the first thermal detection device and an output to provide:
   a first indicator of a first voltage representative of a voltage at the first thermal detection device in response to the second current; and
   a second indicator of a second voltage representative of a voltage difference between the voltage at the first thermal detection device in response to the second current and a voltage at the first thermal detection device in response to the first current; and
   a temperature detection circuit having an input coupled to the output of the voltage detection circuit and an output to provide a first over-temperature indicator based on the first indicator and the second indicator.

2. The device of claim 1, wherein the temperature detection circuit is configured to:
   provide a first state of the first over-temperature indicator in response to the second voltage being greater than the first voltage; and
   provide a second state of the first over-temperature indicator in response to the second voltage being less than the first voltage.

3. The device of claim 1, wherein the voltage detection circuit comprises at least one of:
   an attenuation circuit having an input to receive the voltage at the first thermal detection device in response to the second current and an output to provide the first voltage, wherein an attenuation factor of the attenuation circuit is programmable; and
   an amplification circuit having an input to receive the voltage difference and an output to provide the second voltage, wherein a gain factor of the amplification circuit is programmable.

4. The device of claim 1, wherein an operation of a first circuit component of the device is enabled or disabled based on the first over-temperature indicator.

5. The device of claim 1, wherein the device comprises an integrated circuit comprising the current source circuit, the first thermal detection device, the voltage detection circuit, and the temperature detection circuit.

6. The device of claim 1, further comprising:
 a second thermal detection device disposed at a second location of the device, the second thermal detection device coupleable to the output of the current source circuit; and
 wherein the input of the voltage detection circuit is coupleable to the second thermal detection device;
 wherein the output of the voltage detection circuit further is to provide:
  a third indicator of a third voltage representative of a voltage at the second thermal detection device in response to the second current; and
  a fourth indicator of a fourth voltage representative of a difference between a voltage at the second thermal detection device in response to the second current and a voltage at the second thermal detection device in response to the first current; and
 wherein the output of the over-temperature detection circuit further is to provide a second over-temperature indicator based on the third indicator and the fourth indicator.

7. The device of claim 6, wherein an operation of a second circuit component of the device is enabled or disabled based on the second over-temperature indicator.

8. The device of claim 1, wherein the voltage detection circuit comprises:
 a capacitive element having a first electrode and a second electrode, the first electrode coupleable to the first electrode of the first thermal detection device;
 a transistor having a control electrode, a first current electrode coupled to the second electrode of the capacitive element and a second current electrode coupled to a first voltage reference; and
 wherein the transistor is configured to be enabled when the current source circuit provides the first current and disabled when the current source provides the second current.

9. The device of claim 8, wherein the temperature detection circuit comprises:
 a comparator circuit having a first input coupled to the first electrode of the capacitive element, a second input coupled to the second electrode of the capacitive element, and an output to provide an output voltage based on a comparison of a third voltage to a fourth voltage, wherein the output voltage is representative of the first over-temperature indicator.

10. The device of claim 1, wherein the first thermal detection device comprises a p-n junction.

11. The device of claim 10, wherein:
 the p-n junction comprises a p-type region coupleable to the current source circuit via a first interconnect and a second interconnect and an n-type region coupleable to the current source circuit via a third interconnect, wherein a resistance of the third interconnect is substantially equal to a resistance of the second interconnect;
 the current source circuit is configured to provide the first current to the p-type region via both the first electrode and the second electrode concurrent with a third current provided to the n-type region via the third electrode, wherein the third current is substantially equal to a current at the second electrode; and
 the temperature detection circuit is coupleable to the second interconnect and the third interconnect, wherein the temperature detection circuit is configured to determine the first voltage and the second voltage via the second interconnect and the third interconnect.

12. A device comprising:
 a first thermal detection device disposed at a first location of the device to receive a first current and a second current;
 a voltage detection circuit comprising an input coupleable to the first thermal detection device and an output to provide:
  a first indicator of a first voltage representative of a voltage at the first thermal detection device in response to the second current; and
  a second indicator of a second voltage representative of a voltage difference between the voltage at the first thermal detection device in response to the second current and a voltage at the first thermal detection device in response to the first current; and
 a temperature detection circuit having an input coupled to the output of the voltage detection circuit and an output to provide a first over-temperature indicator based on the first indicator and the second indicator.

13. The device of claim 12, wherein the temperature detection circuit is configured to:
 provide a first state of the first over-temperature indicator in response to the second voltage being greater than the first voltage; and
 provide a second state of the first over-temperature indicator in response to the second voltage being less than the first voltage.

14. The device of claim 12, wherein the voltage detection circuit comprises at least one of:
 an attenuation circuit having an input to receive the voltage at the first thermal detection device in response to the second current and an output to provide the first voltage, wherein an attenuation factor of the attenuation circuit is programmable; and
 an amplification circuit having an input to receive the voltage difference and an output to provide the second voltage, wherein a gain factor of the amplification circuit is programmable.

15. The device of claim 12, wherein an operation of a first circuit component of the device is enabled or disabled based on the first over-temperature indicator.

16. The device of claim 12, wherein the voltage detection circuit comprises:
 a capacitive element having a first electrode and a second electrode, the first electrode coupleable to the first electrode of the first thermal detection device;
 a transistor having a control electrode, a first current electrode coupled to the second electrode of the capacitive element and a second current electrode coupled to a first voltage reference; and
 wherein the transistor is configured to be enabled when a current source circuit provides the first current and disabled when the current source provides the second current.

17. The device of claim 16, wherein the temperature detection circuit comprises:
 a comparator circuit having a first input coupled to the first electrode of the capacitive element, a second input coupled to the second electrode of the capacitive element, and an output to provide an output voltage based on a comparison of a third voltage to a fourth voltage, wherein the output voltage is representative of the first over-temperature indicator.

18. The device of claim 12, wherein the first thermal detection device comprises a p-n junction.

19. The device of claim 18, wherein:
the p-n junction comprises a p-type region coupleable to a current source circuit via a first interconnect and a second interconnect and an n-type region coupleable to the current source circuit via a third interconnect, wherein a resistance of the third interconnect is substantially equal to a resistance of the second interconnect;
the current source circuit is configured to provide the first current to the p-type region via both the first electrode and the second electrode concurrent with a third current provided to the n-type region via the third electrode, wherein the third current is substantially equal to a current at the second electrode; and
the temperature detection circuit is coupleable to the second interconnect and the third interconnect, wherein the temperature detection circuit is configured to determine the first voltage and the second voltage via the second interconnect and the third interconnect.

20. A device comprising:
a current source circuit having an output to separately provide a first current and a second current;
a first thermal detection device disposed at a first location of the device, the first thermal detection device coupleable to the output of the current source circuit;
a voltage detection circuit comprising an input coupleable to the first thermal detection device and an output to provide:
  a first indicator of a first voltage representative of a voltage at the first thermal detection device in response to the second current; and
  a second indicator of a second voltage representative of a voltage difference between the voltage at the first thermal detection device in response to the second current and a voltage at the first thermal detection device in response to the first current;
a temperature detection circuit having an input coupled to the output of the voltage detection circuit and an output to provide a first over-temperature indicator based on the first indicator and the second indicator; and
an attenuation circuit having an input to receive the voltage at the first thermal detection device in response to the second current and an output to provide the first voltage, wherein an attenuation factor of the attenuation circuit is programmable.

* * * * *